(12) United States Patent
Houston et al.

(10) Patent No.: US 8,267,475 B2
(45) Date of Patent: Sep. 18, 2012

(54) ADJUSTMENT DEVICE IN AN AUTOMOTIVE VEHICLE WITH A MOVABLE ADJUSTMENT PART

(75) Inventors: Robert Houston, Leichlingen (DE); Sascha Eckhoff, Köln (DE); Michael Lindemann, Rheda-Wiedenbrück (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 707 days.

(21) Appl. No.: 11/985,289

(22) Filed: Nov. 14, 2007

(65) Prior Publication Data

US 2008/0121776 A1    May 29, 2008

(30) Foreign Application Priority Data

Nov. 23, 2006 (DE) .......... 10 2006 055 649
Dec. 4, 2006 (DE) .......... 10 2006 057 406
Aug. 21, 2007 (DE) .......... 10 2007 039 363

(51) Int. Cl.
*B60N 2/235* (2006.01)
(52) U.S. Cl. ............... 297/367 R; 297/452.18
(58) Field of Classification Search ............ 297/452.18, 297/367
See application file for complete search history.

(56) References Cited

U.S. PATENT DOCUMENTS

| | | | | |
|---|---|---|---|---|
| 4,188,064 A | * | 2/1980 | Cheshire | 297/367 R |
| 4,473,318 A | * | 9/1984 | Schrock | 403/404 |
| 5,050,932 A | * | 9/1991 | Pipon et al. | 297/354.12 |
| 5,567,017 A | * | 10/1996 | Bourgeois et al. | 297/452.2 |
| 5,570,508 A | * | 11/1996 | Ress | 29/897.3 |
| 6,264,274 B1 | | 7/2001 | Frohnhaus et al. | |
| 6,375,267 B1 | * | 4/2002 | Ishikawa | 297/452.18 |
| 6,513,878 B2 | * | 2/2003 | Nagayasu et al. | 297/452.18 |
| 7,066,552 B2 | * | 6/2006 | Yoshida | 297/452.18 |

FOREIGN PATENT DOCUMENTS

| | | |
|---|---|---|
| DE | 26 04 489 B2 | 7/1978 |
| DE | 103 27 090 A1 | 12/2004 |
| DE | 197 37 034 B4 | 9/2006 |
| DE | 197 37 036 B4 | 9/2006 |
| EP | 0 445 528 A2 | 9/1991 |
| EP | 1 186 516 A1 | 3/2002 |

OTHER PUBLICATIONS

WO 2005/097543 A1. Weber et a;/ Oct. 20, 2005, Abstract and Figures.*

* cited by examiner

*Primary Examiner* — Sarah B McPartlin
(74) *Attorney, Agent, or Firm* — McCarter & English, LLP

(57) ABSTRACT

The invention relates to an adjustment device of an automotive vehicle. It comprises a movable adjustment part the position of which is adjustable according to the user's wishes. The adjustment part comprises at least a first piece and a second piece. These pieces are fixedly joined together in a connection region. Each piece comprises a border that is connected to the border of the other piece in the connection region. One piece may be made from a higher quality material and the other piece from a lower quality material. One piece may be made from a thinner material and the other piece from a thicker material.

18 Claims, 7 Drawing Sheets

ADJUSTMENT DEVICE IN AN AUTOMOTIVE VEHICLE WITH A MOVABLE ADJUSTMENT PART

CROSS-REFERENCE TO RELATED APPLICATIONS

This application claims priority to German Application Nos. DE 10 2006 055 649.6, filed Nov. 23, 2006, DE 10 2006 057 406.0, filed Dec. 4, 2006 and DE 10 2007 039 363.8, filed Aug. 21, 2007, all of which are expressly incorporated by reference in their entireties as part of the present disclosure.

BACKGROUND OF THE INVENTION

The invention relates to a seat back hinge mounting for a forwardly foldable motor vehicle seat, with a first hinge arm and a second hinge arm adapted for relative rotation about a hinge pin, a locking cam, which is disposed on the second hinge arm and is movable between a locking position and a release position, being provided, a first stop flange and a second stop flange being provided on the first hinge arm and the locking cam cooperating with the second stop flange in the locking position and having come free from said second stop flange in the release position.

In prior art, such type adjustment parts are made from one piece, they are mostly made and machined as a blank from a steel sheet. An adjustment part of the type mentioned herein is for example a rear rocker arm of a height adjustment device of an automotive vehicle seat, the reader being referred by way of example to the prior art documents EP 0 445 528 A2 and U.S. Pat. No. 6,264,274 B1. The term adjustment part is understood to refer to an articulated arm of an adjustment device as it is known from the documents DE 103 27 090 A1 and DE 26 04 489 B2 for example. An adjustment part is also an adjustable arm in the adjustment device of a steering column, the reader being referred in this context to the documents DE 197 37 036 B4 and DE 197 37 034 B4 for example. What is characteristic for an adjustment part is that it changes its position relative to a point of reference such as during adjustment, for example of the height of a seat, the incline of a backrest, the angular position of a steering column and so on. An adjustment part in the meaning of the invention often is a four-bar linkage. As a rule, an adjustment part has two functional regions which include bearing regions, articulated regions, toothed regions, guiding regions, clamping regions and fastening regions. Typically, the adjustment part is subjected to considerable load in the event of an accident, more specifically in a vehicle crash event.

It has already been known to manufacture adjustment parts by superposing several thin blanks having the same shape, meaning to build them in a sandwich style. It is also known to manufacture parts from what are referred to as "tailored blanks", the reader being referred, by way of example, to the Internet site of Thyssen-Krupp with regard to this keyword and to the document EP 1 186 516 A1. Various steel sheet materials are thereby joined together at their narrow side by laser welding. Machining such as blanking, machining a toothed surface feature or an articulated region occurs thereafter. In this way, it is possible to use high-quality material for a region subjected to high load at one end of an adjustment part and a lower cost or lower quality material for the rest.

It is the object of the invention to develop an adjustment apparatus of the type mentioned herein above and the corresponding method in such a manner that individual functional regions of the adjustment part may be made and largely finish machined as pieces from special, particularly suited materials, these pieces being next assembled to form the adjustment part.

SUMMARY OF THE INVENTION

In accordance with the invention, the movable adjustment part is composed of at least two individual pieces. The two individual pieces usually have a distinctly different shape. They are joined together at a narrow side as it is also known from the so-called "tailored blanks"; they are not assembled along their main surfaces as this occurs with the sandwich construction discussed herein above. The various pieces may be adapted to the load they are subjected to so that, in a crash event in particular, a higher-quality material, for example a tempered, heat treated and/or hardened material may be utilized in zones of very high load whereas the rest of the adjustment part, and as a result thereof the second piece, may be made from a lower-cost or lower quality material. No further connecting elements are thereby needed in the connection region, the pieces being directly assembled at their narrow sides. Assembly may occur so that the two parts, which lie in one plane such as on a table, are pushed together. It is preferred to provide an undercut, assembly in one plane is not possible then, and the two pieces are put together transverse to the plane of the table, like a puzzle.

The connection region is preferably positioned in such a manner within the adjustment part that, as far as practicable, little high-quality and lots of lower quality and/or little thicker and lots of thinner material may be used. The connection region may extend along any lines. Its configuration is adapted to the respective needs. Accordingly, the connection region may be straight, curved, toothed, stepped, and so on and may in particular be configured to have undercuts, meaning to provide interlocking engagement.

Preferably, the two pieces may only have different material thickness. It is possible to make the two pieces from material having the same thickness, with the material being different. Preferably, the two pieces are finished prior to assembly, and are in particular, heat treated and/or hardened when the need arises.

In the connection region, the pieces are fixedly connected together. They cannot be separated in the connection region without being destroyed. In order to secure the connection region after having assembled or put together the parts, deformation is performed in the connection region so that the pieces can no longer fall apart. Additionally or also without deformation taking place, another connection means may be utilized, for example a welding process.

Preferably, the adjustment part has at least two functional regions and the connection region is located between these two functional regions. A functional region is understood to be a region of the adjustment part at which said adjustment part contacts another component part and is capable of moving relative to this other component part or is connected with said other component part and capable of moving together with said other component part relative to the other component parts. The other component part is a bearing axle, a detent part, a clamping part, a toothed part, a hinge connection, this enumeration not being exhaustive.

Other features and advantages will become more apparent upon reviewing the appended claims and the following non restrictive description of embodiments of the invention, given by way of example only with reference to the drawing.

DETAILED DESCRIPTION OF THE CURRENTLY PREFERRED EMBODIMENTS

Figure 1:
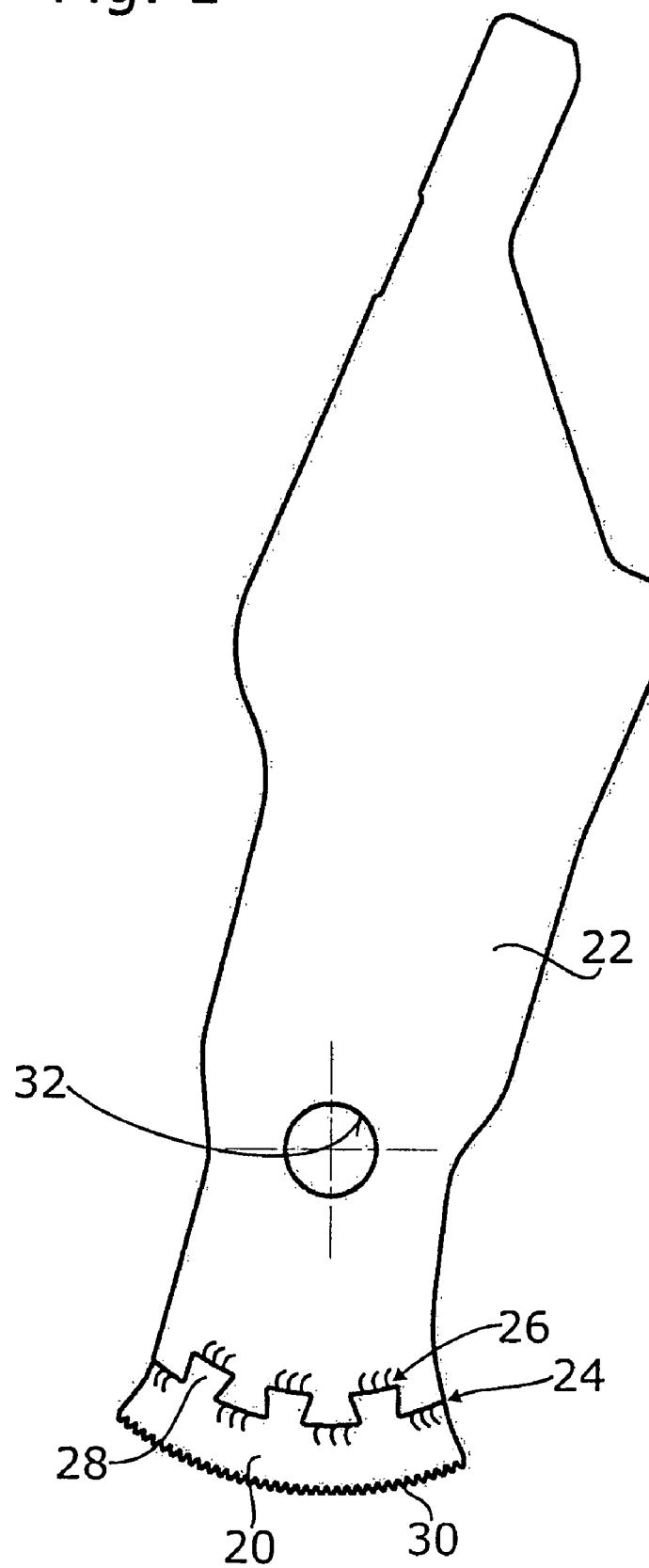
FIG. 1 shows a top view of an adjustment part of the present invention.

The adjustment part shown in FIG. 1 is a piece of an adjustment device of an automotive vehicle seat; it could be utilized in a similar form for another adjustment device of an automotive vehicle and more specifically in an automotive vehicle. An adjustment device is understood to refer to the complete unit with all the component parts which, during adjustment, are directly moved relative to a fixed point, such as the underbody of an automotive vehicle. Such type adjustment devices are for example height adjustment devices, seat pan incline adjustment devices, backrest incline adjustment devices, adjustment devices for height and/or longitudinal adjustment of a steering wheel and so on. On height adjustment devices for automotive vehicle seats, there is usually provided a four-bar linkage that is composed of a floor rail, a front rocker, a seat carrier and a rear rocker and that has a fixing device associated thereto for example by means of a toothed surface feature. For such a so-called parallelogram height adjustment device, the adjustment part shown in FIG. 1 may for example be used. It is a backrest rocker.

The adjustment part is composed of at least two pieces, namely a first piece 20 and a second piece 22. These pieces are fixedly and durably joined together in a connection region 24 so that the finish machined adjustment part may be utilized and used in the same manner as an integrally manufactured prior art adjustment part. The connection has a quality such that the finished adjustment part has utilization properties similar to those of the integral prior art adjustment part.

Each piece 20, 22 has main surfaces lying in the image plane in the FIGS. 1 through 5 and 9, and a circumferential border. In the connection region 24, the borders of the two pieces 20, 22 are in touching contact and joined together. The connection may be shape-mating like in the exemplary embodiments shown in the FIGS. 1 through 3 and 9, lower part of the Fig, but it may also not be shape-mating and, as a result thereof, have no undercut like in FIG. 4 and in FIG. 9, upper part.

Referring to FIG. 1, the two pieces 20, 22 are welded together in the connection region 24. A weld seam 26 is shown. It may be obtained by laser welding for example. It is preferably located at the free ends of the respective borders only, concretely, at the free ends of the various projections 28 that have an undercut in the exemplary embodiment shown in FIG. 1. The weld seam consists more specifically of individual local connections.

The adjustment part shown in FIG. 1 has two functional regions, namely a toothed surface feature 30 and a bearing hole 32. Both are provided in different pieces. The first piece 20, which comprises the toothed surface feature 30, is made from a higher-quality material, an example thereof being a high-quality steel like 42 CrMo4 or 16 MnCr4, or a material subjected to higher-quality processes, such as hardening, heat treatments and so on. Higher-quality material may also mean higher price. The second piece 22, which comprises the bearing hole 32, may be made from a lower-quality material such as plain steel, construction steel for example, or a material that has not been subjected to higher quality processing and/or with no complex machining. The material may be formed by hot rolling or by cold rolling. Generally, the two pieces 20, 22 have different hardness. Typically, the thickness ranges between two and six millimeters, thicknesses of more than six to eight millimeters are seldom encountered. It is possible to manufacture at least one piece in a sandwich structure from a few blanks, for example from two to three blanks. The pieces are finished, meaning more specifically heat treated, hardened, refined or the like before they are joined together in the connection region 24. This affords savings in space during hardening for example and the expense is reduced because the parts to be hardened are smaller.

An undercut in the region of the projections 28 results in an interlock. It may be achieved in any manner. In the embodiment shown in FIG. 1, the projections are substantially trapezoidal, in the embodiment shown in FIG. 4, they are undulated. If the connection region 24 is not rectilinear, the force is transferred through material. In principle, a connection achieved using usual connection means such as welding, gluing, soldering and so on is sufficient. Through engagement of the two pieces in the connection region and in particular through interlocking engagement, the cohesion of the two pieces 20, 22 obtained in the connection region possibly needs no additional connection means.

Figure 2:
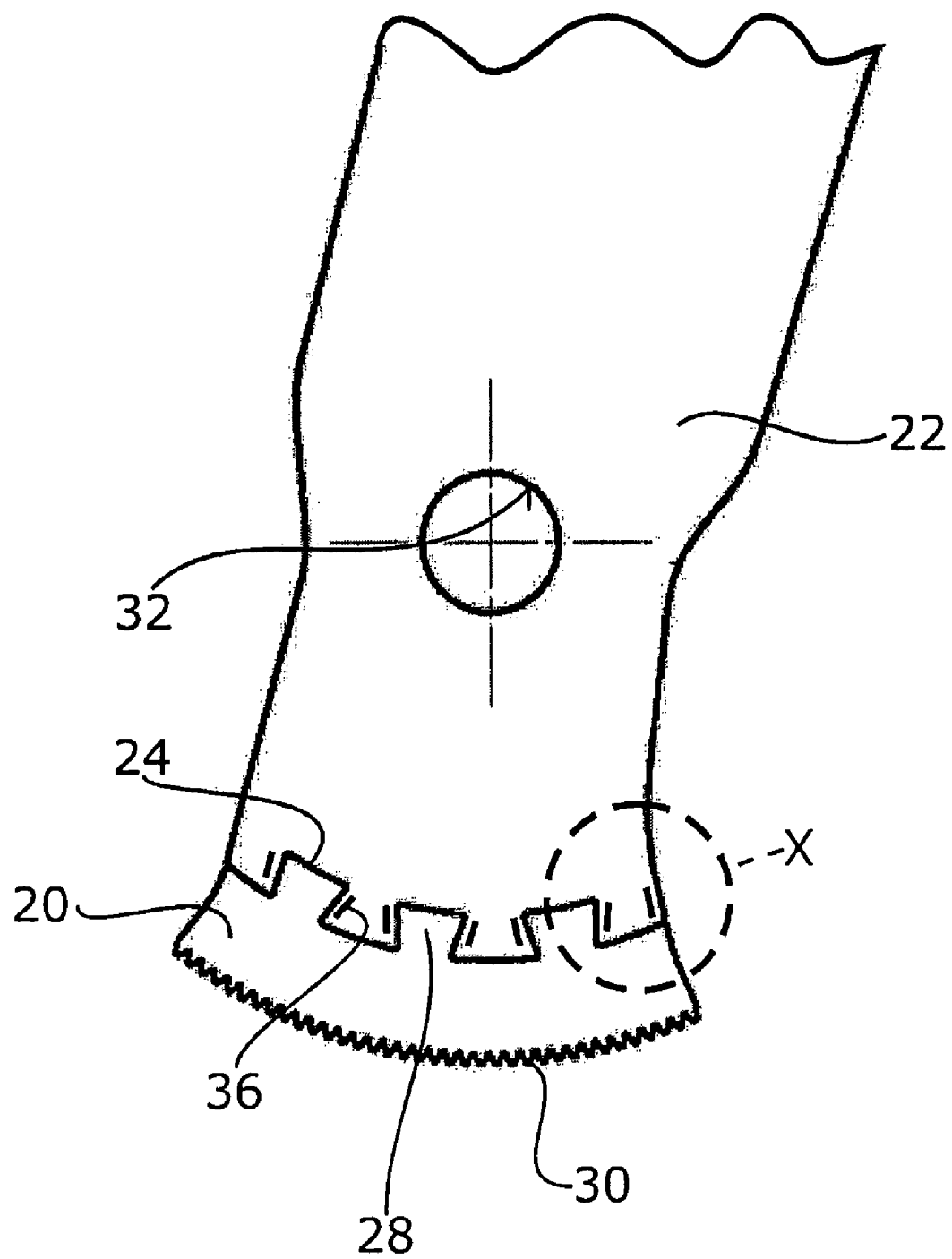
FIG. 2 shows a top view like FIG. 1, with the pieces now being deformed in the connection region by local stampings.
Figure 5:
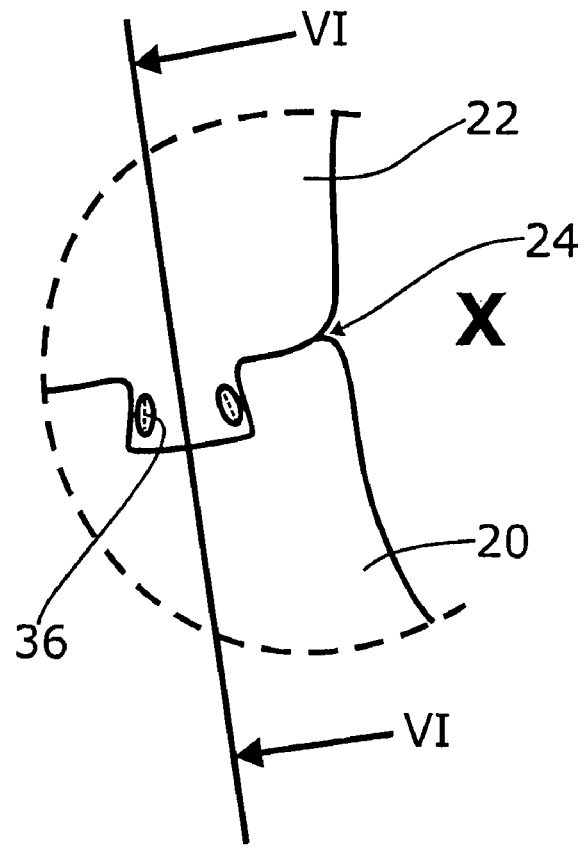
FIG. 5 shows an enlarged view of the element X in FIG. 2.

In the embodiment shown in FIG. 2, material in the region of the side flanks of the trapezoidal projections 28 is stamped together in local stampings 36, FIG. 5 in particular shows small islands into the surface of which there is pressed a stamp or another tool so that the material is squeezed to the side, thus being displaced toward the contact region of the two pieces. An intimate connection is achieved there as a result thereof, this connection lasting without any additional connection means like welding, soldering and gluing. It may be facilitated or improved by additional connection means such as welding, soldering or adhesive methods.

Figure 3:
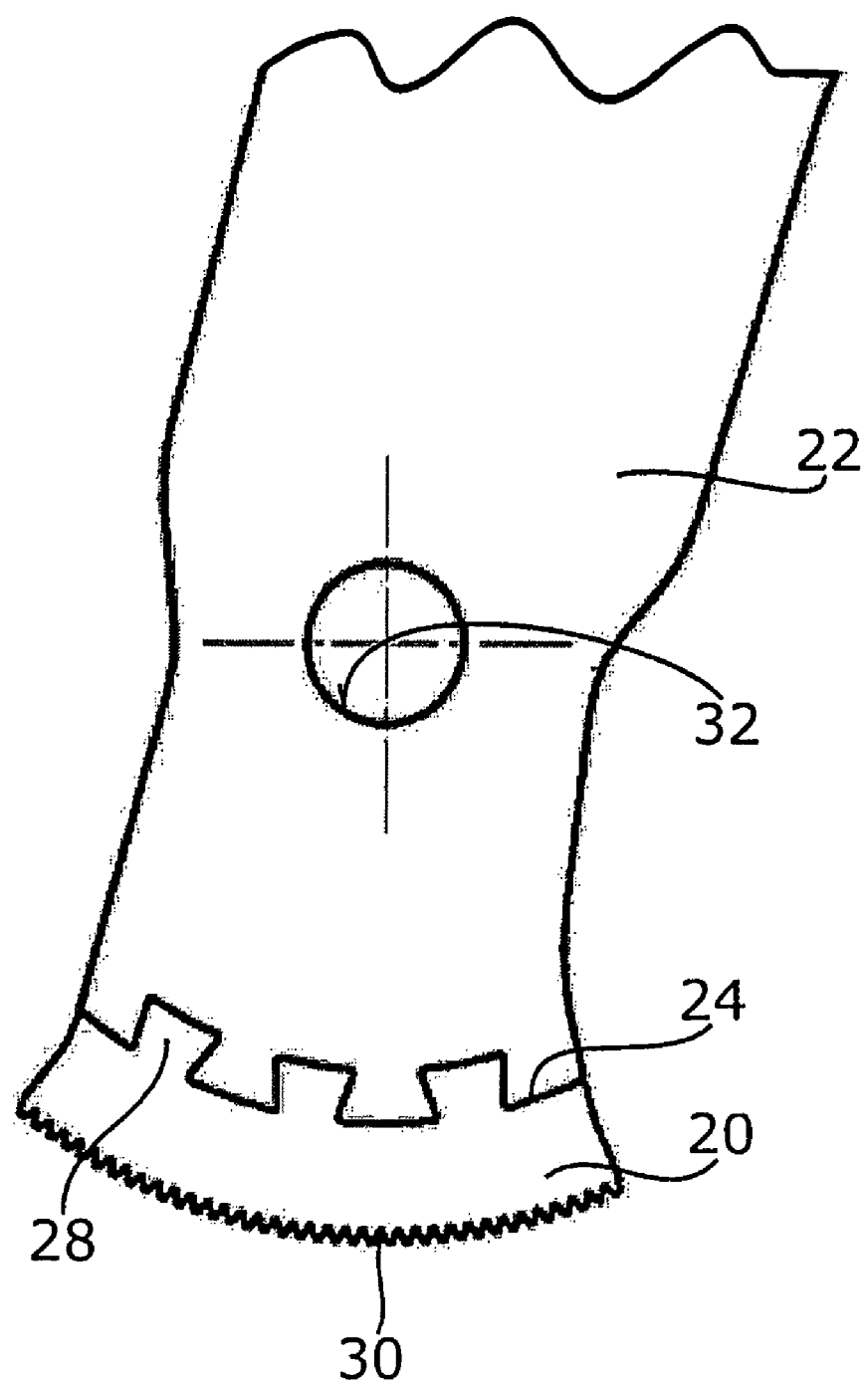
FIG. 3 shows a top view like FIG. 1, with the pieces now being connected together in the connection region.
Figure 4:
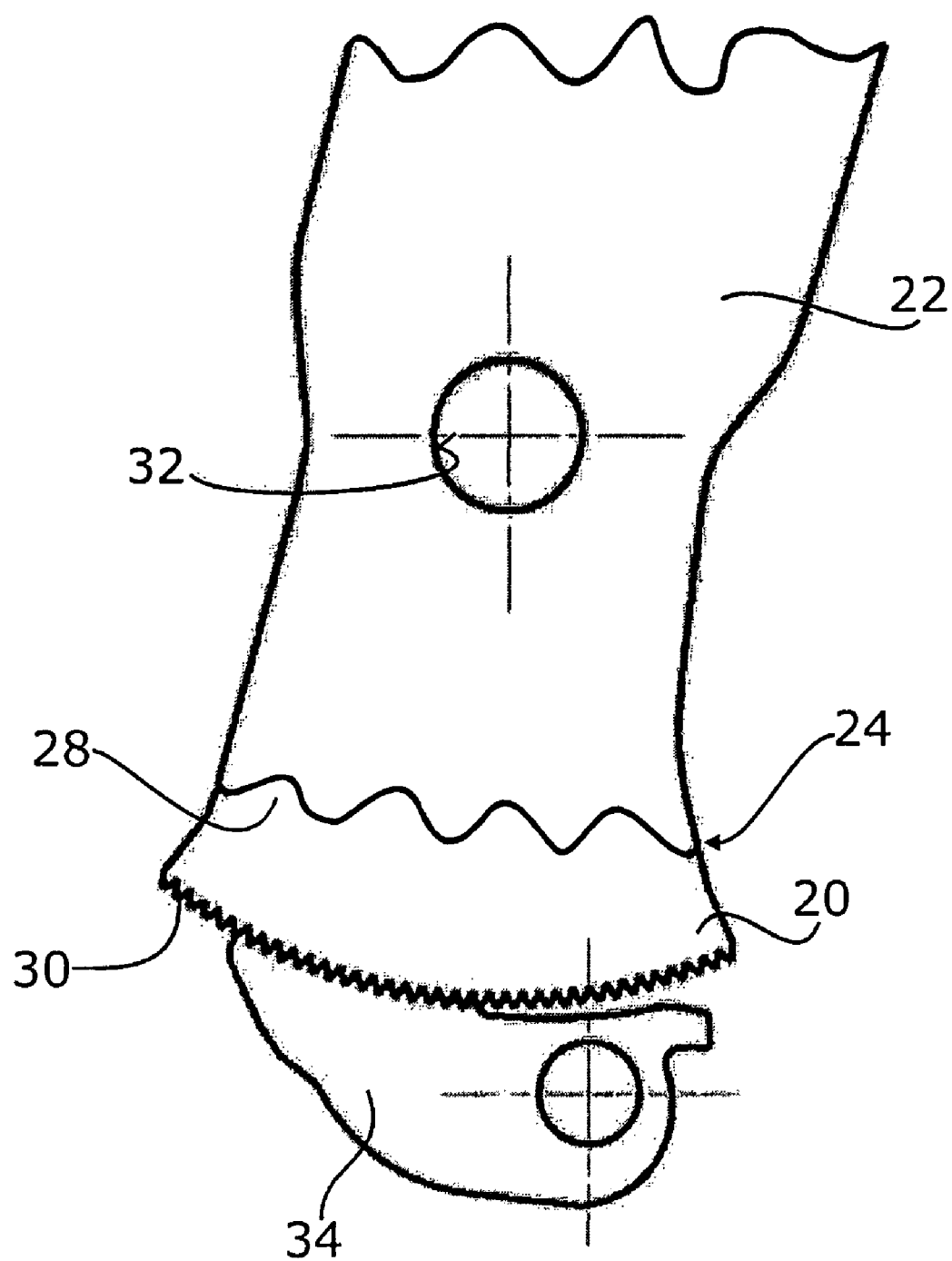
FIG. 4 shows a top view like FIG. 1 for another exemplary embodiment and with an additional stopper part.

In the embodiment shown in FIG. 3, the two pieces 20, 22 are interlocking. They are additionally connected by a connection means, here by an adhesive means that has not been illustrated herein. In the embodiment shown in FIG. 4, the connection region 24 extends along a serpentine line. If the projections 28 are configured in a mushroom shape, a shape-mating engagement is achieved. In FIG. 4, the two pieces are joined together by an adhesive means.

FIG. 4 shows still another component part 34 of the adjustment device. The functional region toothed surface feature 30 is in releasable engagement with this component part 34. The component part 34, which is configured to be a toothed stopper part, may be pivoted about an axis in a known manner. In the state shown in the drawing, it engages the toothed surface feature 30.

In a similar way, the other functional region also has an adjoining component part, a shaft (not shown) may for example be mounted in the mounting hole 32 or a tube (not shown) may be fixedly connected, the functional region then loosing its mounting function. This tube then moves together with the adjustment part relative to the other component parts.

Figure 6:
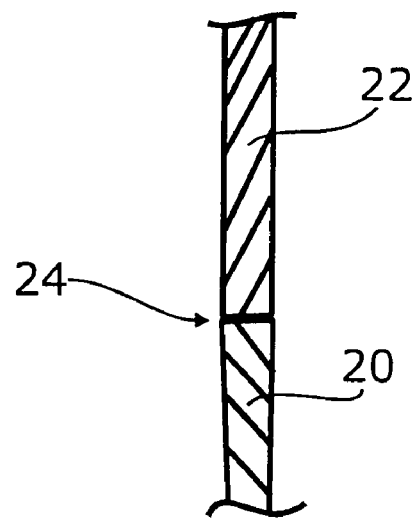
FIG. 6 shows a sectional view taken along section line VI-VI in FIG. 5.
Figure 7:
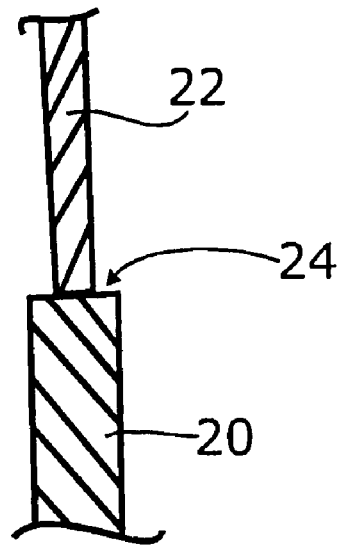
FIG. 7 shows a sectional view like FIG. 6, but now in another embodiment of the two pieces.
Figure 8:
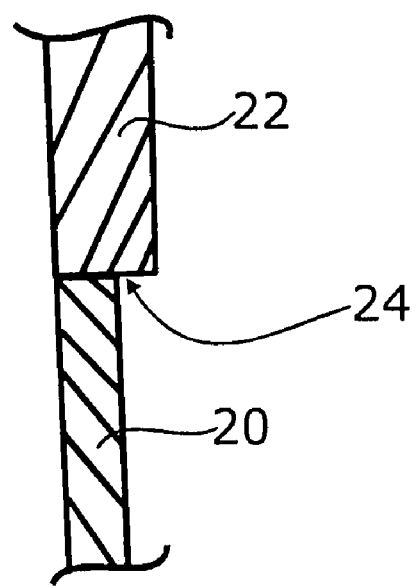
FIG. 8 shows a sectional view like FIG. 6 but in still another embodiment of the present invention.

The embodiments shown in the FIGS. 6 through 8 shows that different material thicknesses may be assembled in the connection region 24. FIG. 6 shows the case of pieces 20, 22 having the same thickness. The two main surfaces are aligned. FIG. 7 shows the case in which the first piece 20 is considerably thicker than the second piece 22. Here, it is not the main surfaces that are aligned but the center lines of the two pieces. In the embodiment shown in FIG. 8, the first piece is thinner, the second piece considerably thicker. Now, a main surface of the two pieces is aligned whilst the other main surface has a step formed therein.

Figure 9:
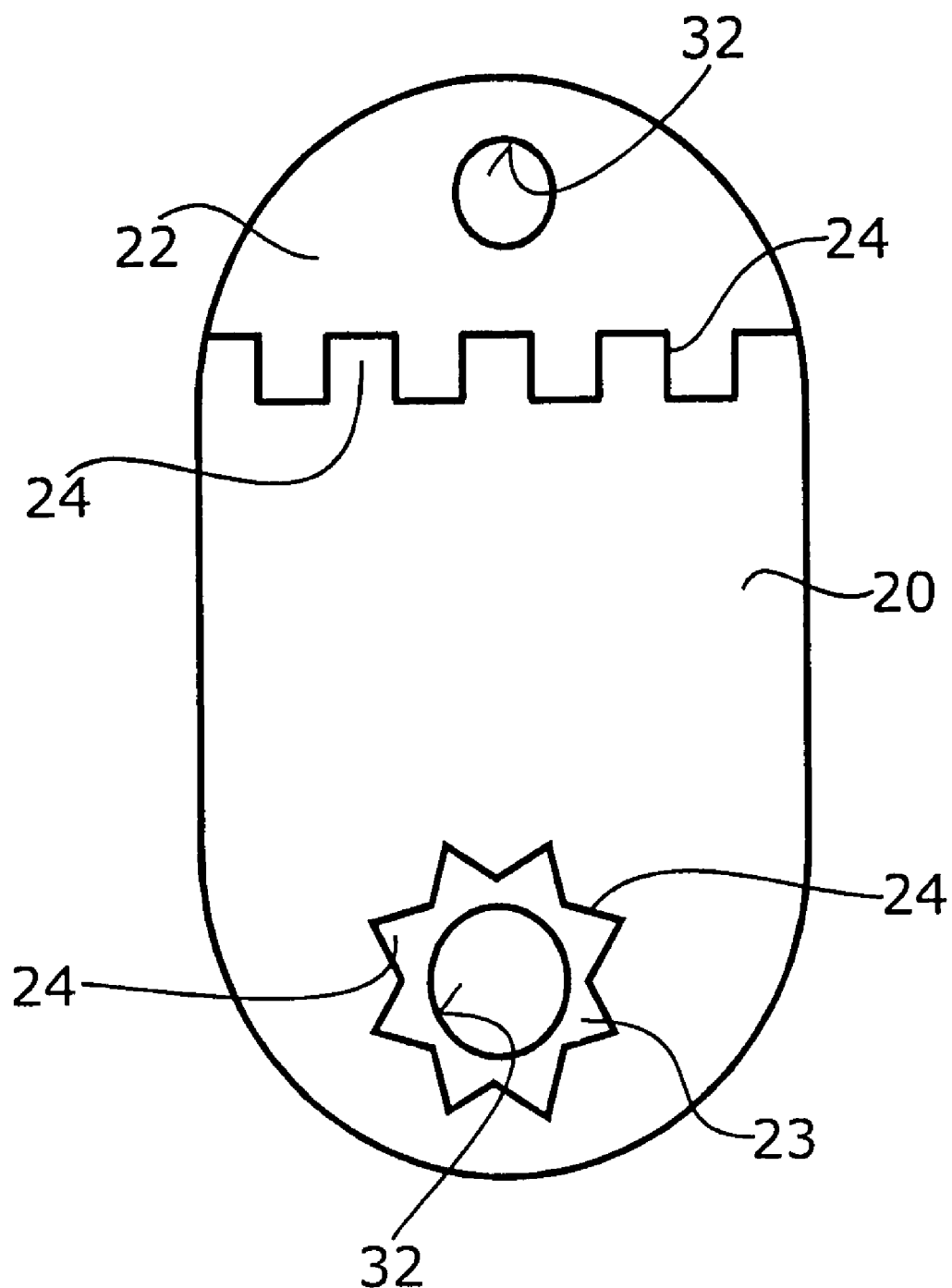
FIG. 9 shows a top view of an adjustment part with three pieces.

FIG. 9 shows an adjustment part with three pieces 20, 22, 23. The adjustment part is shown in its basic structure in order to explain the construction possibilities within the scope of the invention. The mounting hole 32 is realized by a star-shaped third piece 23 that matingly engages the first piece 20. The first piece 20 has no functional region. The second piece 22 is linked to the first piece 20 through a rectangular line that characterizes the course of the connection region 24. The second piece 22 has a functional region in the form of an additional mounting hole 32.

As compared to an integral prior art adjustment part, weight savings may be achieved since thinner material may be utilized on the less loaded locations on the adjustment part when subjected to load. Additional connection elements are omitted, this translating in savings in cost. Finishing processes are only carried out on the pieces needing them. In spite of the additional costs for manufacturing the connection region 24, cost savings are generated compared to an integrally manufactured adjustment part and one obtains an adjustment part that is of higher quality than the quality that may be achieved with an integrally formed adjustment part.

What is claimed is:

1. An adjustment device of an automotive vehicle comprising a movable adjustment part the position of which is adjustable according to a user's wishes, wherein said adjustment part comprises at least a first piece and a second piece, the first and second pieces are originally separate and then are fixedly joined together in a connection region, each piece has main surfaces and a circumferential border extending therebetween, wherein at least a portion of the circumferential border is joined in the connection region to at least a portion of the circumferential border of the other piece, the first and second pieces do not overlap, and (i) the first and second pieces have different material qualities, and (ii) the first and second pieces are of the same material thickness in the connection region.

2. The adjustment device as set forth in claim 1, wherein the two pieces are each made from a flat material, a steel sheet or steel plates.

3. The adjustment device as set forth in claim 1, wherein the adjustment part is located in an adjustable automotive vehicle seat or in a steering column adjustment device.

4. The adjustment device as set forth in claim 1, wherein at least one of (i) one piece is mechanically deformed or stamped in the connection region after the two pieces have been assembled, and (ii) the two pieces are joined together in the connection region by additional connection means.

5. The adjustment device as set forth in claim 4, wherein the additional connection means are at least one of an adhesive, a weld joint or a solder joint.

6. The adjustment device as set forth in claim 1, wherein, in a region of its border, each piece is conformably connected to the border of the other piece in the connection region.

7. The adjustment device as set forth in claim 1, wherein the adjustment part includes two functional regions, the connection region is located between these two functional regions, and one of said functional regions comprises one of a bearing means and an articulated region, and the other of said functional regions comprises one of a toothed surface feature, an actuation flank and a detent region.

8. The adjustment device as set forth in claim 1, wherein the first and second pieces are substantially flat parts that are bounded by the main surfaces and by the border which is relatively narrow compared with the main surfaces.

9. The adjustment device as set forth in claim 1, wherein said adjustment part comprises at least a third part.

10. The adjustment device as set forth in claim 1, wherein the main surfaces comprise generally opposing main surfaces.

11. An adjustment device of an automotive vehicle comprising a movable adjustment part the position of which is adjustable according to a user's wishes, wherein said adjustment part comprises at least a first piece and a second piece, wherein the first and second pieces are originally separate and then are fixedly and inseparably joined together in a connection region, each piece has main surfaces and a circumferential border extending therebetween, at least a portion of the circumferential border is joined in the connection region to at least a portion of the circumferential border of the other piece, the first and second pieces are not in contact at their main surfaces, the first and second pieces do not overlap, and (i) the first and second pieces have different material qualities, and (ii) one piece is made from a thinner material and the other piece is made from a thicker material, and wherein, in the connection region, the two pieces are of different material thicknesses.

12. An adjustment device of an automotive vehicle comprising a movable adjustment part the position of which is adjustable according to a user's wishes, wherein said adjustment part comprises at least a first piece and a second piece, wherein the first and second pieces are originally separate and are then fixedly and inseparably joined together in a connection region, each piece has main surfaces and a circumferential border extending therebetween, at least a portion of the circumferential border is joined in the connection region to at least a portion of the circumferential border of the other piece, the first and second pieces are not in contact at their main surfaces, the connection is an interlocking connection in the connection region, the first and second pieces do not overlap, and at least one of (i) the first and second pieces have different material qualities, and (ii) one piece is made from a thinner material and the other piece is made from a thicker material, and wherein the adjustment part includes two functional regions, the connection region is located between these two functional regions, and one of said functional regions comprises one of a bearing means and an articulated region, and the other of said functional regions comprises one of a toothed surface feature, an actuation flank and a detent region.

13. A method of manufacturing a movable adjustment part of an adjustment device of an automotive vehicle, the position of said adjustment part being adjustable according to a user's wishes by actuating the adjustment device, the method comprising the following steps:

manufacturing and finish processing a first piece of the adjustment part and a second piece of the adjustment part, wherein each piece has main surfaces and a circumferential border extending therebetween that is suited for connection to a mating circumferential border of the other piece, the first and second pieces are made from different material qualities; and assembling and fixedly and inseparably joining together said two pieces with the borders in contact with each other in a connection region so that the first and second pieces do not overlap;

wherein, in the connection region, the two pieces are of different material thicknesses.

14. A method as set forth in claim 13, further comprising:

forming a functional region on at least one piece, wherein the functional region is a region of the adjustment part in which said adjustment part is in contact with another component part; and engaging the two pieces with each other such that they are joined together in the connection region.

15. The method as set forth in claim 14, wherein the functional region is a bearing means, a toothed surface feature or an articulation means.

16. The method as set forth in claim 13, wherein the connection is an interlocking connection in the connection region.

17. The method as set forth in claim 13 wherein the pieces are finish processed before being assembled and joined together in the connection region.

18. An adjustment device of an automotive vehicle comprising a movable adjustment part the position of which is adjustable according to a user's wishes, wherein said adjustment part comprises at least a first piece and a second piece, wherein the first and second pieces are originally separate and then are fixedly joined together in a connection region, each piece has main surfaces and a circumferential border extending therebetween, at least a portion of the circumferential border is joined in the connection region to at least a portion of the circumferential border of the other piece, the first and second pieces are not in contact at their main surfaces, the first and second pieces do not overlap, and (i) the first and second pieces have different material qualities, and (ii) one piece is made from a thinner material and the other piece is made from a thicker material, and wherein, in the connection region, the two pieces are of different material thicknesses, wherein the first and second pieces are aligned at centerlines thereof.

* * * * *